(12) United States Patent
Ogale et al.

(10) Patent No.: US 12,095,629 B2
(45) Date of Patent: Sep. 17, 2024

(54) SECURITY THREAT DETECTION DURING SERVICE QUERY HANDLING

(71) Applicant: VMWARE, INC., Palo Alto, CA (US)

(72) Inventors: Nakul Ogale, Pune (IN); Shirish Vijayvargiya, Pune (IN); Sachin Shinde, Pune (IN)

(73) Assignee: VMware LLC, Palo Alto, CA (US)

( * ) Notice: Subject to any disclaimer, the term of this patent is extended or adjusted under 35 U.S.C. 154(b) by 273 days.

(21) Appl. No.: 16/878,652

(22) Filed: May 20, 2020

(65) Prior Publication Data
US 2021/0314237 A1    Oct. 7, 2021

(30) Foreign Application Priority Data

Apr. 7, 2020   (IN) .............................. 202041015268

(51) Int. Cl.
| | |
|---|---|
| *H04L 12/24* | (2006.01) |
| *G06F 9/455* | (2018.01) |
| *H04L 29/12* | (2006.01) |
| *H04L 41/046* | (2022.01) |
| *H04L 41/28* | (2022.01) |
| *H04L 61/4511* | (2022.01) |

(52) U.S. Cl.
CPC .......... *H04L 41/28* (2013.01); *G06F 9/45558* (2013.01); *H04L 41/046* (2013.01); *H04L 61/4511* (2022.05); *G06F 2009/45587* (2013.01); *G06F 2009/45595* (2013.01)

(58) Field of Classification Search
CPC ... H04L 41/28; H04L 41/046; H04L 61/1511; H04L 63/102; H04L 63/20; G06F 9/45558; G06F 2009/45595; G06F 2009/45587; G06F 21/604; G06F 21/6218
See application file for complete search history.

(56) References Cited

U.S. PATENT DOCUMENTS

2005/0257264 A1* 11/2005 Stolfo .................. G06F 21/552
                                                            726/23
2018/0088976 A1*  3/2018 Leslie-Hurd ........ G06F 9/45558
(Continued)

OTHER PUBLICATIONS

Alharbi et al., Collaborative Client-Side DNS Cache Poisoning Attack, Jun. 17, 2019, IEEE, pp. 1153-1161. (Year: 2019).*
(Continued)

*Primary Examiner* — Muhammad Raza
(74) *Attorney, Agent, or Firm* — King Intellectual Asset Management (57) ABSTRACT

Example methods and systems for a computer system to perform security threat detection during service query handling are described. In one example, a process running on a virtualized computing instance supported by the computer system may generate and send a first service query specifying a query input according to a service protocol. The first service query may be detected by a security agent configured to operate in a secure enclave that is isolated from the process. Next, the security agent may generate and send a second service query specifying the query input in the first service query. It is then determined whether there is a potential security threat based on a comparison between (a) a first reply received responsive to the first service query and (b) a second reply received responsive to the second service query.

9 Claims, 6 Drawing Sheets

(56) References Cited

U.S. PATENT DOCUMENTS

| | | | |
|---|---|---|---|
| 2018/0203801 A1* | 7/2018 | Leslie-Hurd | G06F 9/45558 |
| 2018/0212966 A1* | 7/2018 | Costa | H04L 63/10 |
| 2018/0262387 A1* | 9/2018 | Mathew | H04L 41/0668 |
| 2019/0251257 A1* | 8/2019 | McKeen | G06F 12/1491 |
| 2020/0021618 A1* | 1/2020 | Smith | H04L 63/0263 |
| 2021/0124823 A1* | 4/2021 | Lidzborski | G06F 21/53 |
| 2021/0209201 A1* | 7/2021 | Ge | G06F 21/54 |
| 2021/0232681 A1* | 7/2021 | Tsirkin | G06F 21/44 |
| 2022/0156390 A1* | 5/2022 | Karame | G06F 21/64 |

OTHER PUBLICATIONS

Fatemah Alharbi et al. Collaborative Client-Side DNS Cache Poisoning Attack.

\* cited by examiner

SECURITY THREAT DETECTION DURING SERVICE QUERY HANDLING

RELATED APPLICATION

This application claims the benefit of Foreign Application Serial No. 202041015268 filed in India entitled "SECURITY THREAT DETECTION DURING SERVICE QUERY HANDLING", on Apr. 7, 2020, by VMWARE, Inc., which is herein incorporated in its entirety by reference for all purposes.

BACKGROUND

Virtualization allows the abstraction and pooling of hardware resources to support virtual machines in a software-defined data center (SDDC). For example, through server virtualization, virtualized computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, it is desirable to detect potential security threats that may affect the performance of hosts and VMs in the SDDC.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1:
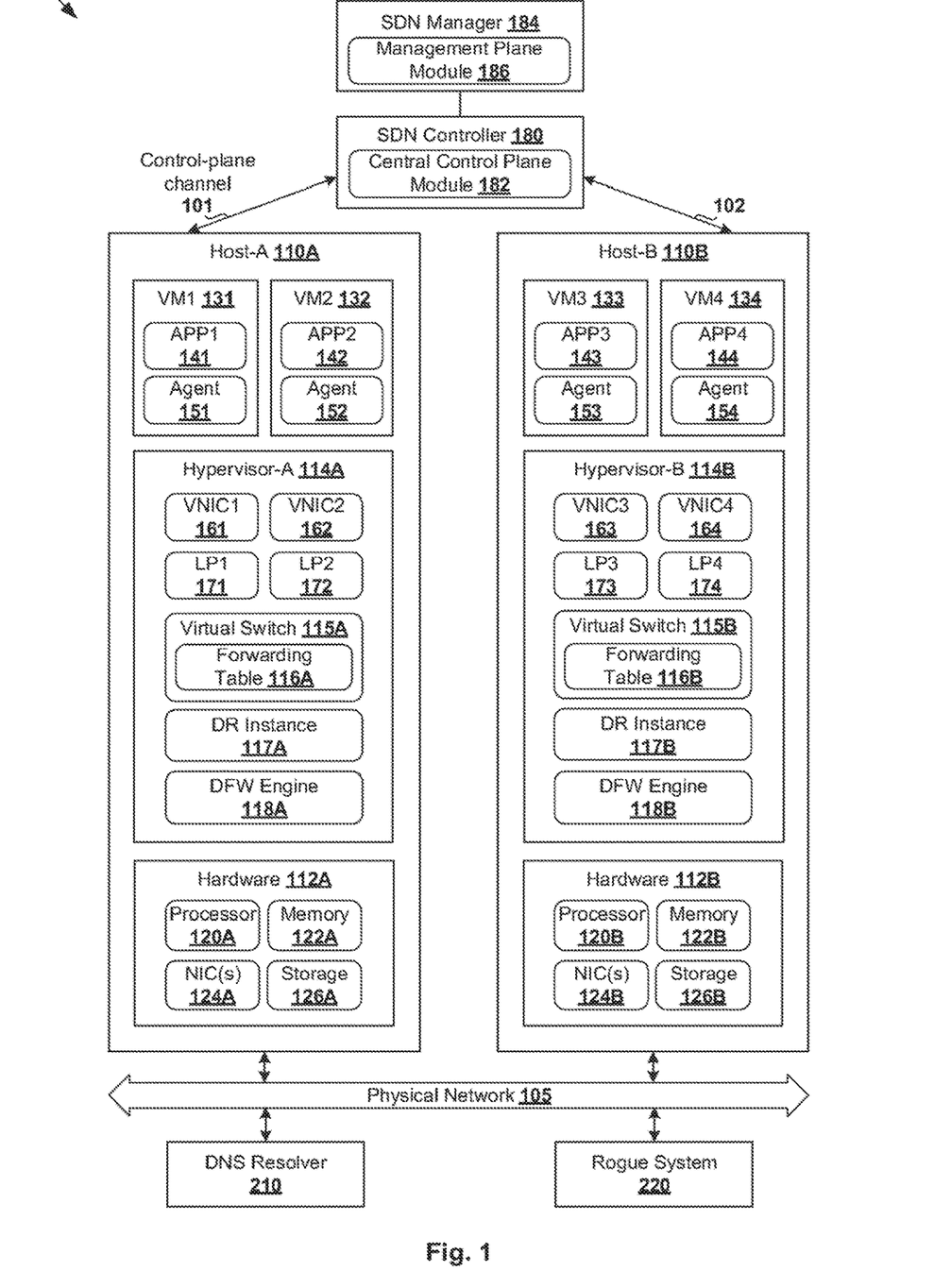
FIG. 1 is a schematic diagram illustrating an example software-defined networking (SDN) environment in which security threat detection during service query handling may be performed.

Challenges relating to data center security will now be explained in more detail using FIG. 1, which is a schematic diagram illustrating example software-defined networking (SDN) environment 100 in which security threat detection during service query handling may be performed. It should be understood that, depending on the desired implementation, SDN environment 100 may include additional and/or alternative components than that shown in FIG. 1. Although the terms "first" and "second" are used to describe various elements, these elements should not be limited by these terms. These terms are used to distinguish one element from another. For example, a first element may be referred to as a second element, and vice versa.

SDN environment 100 includes multiple hosts 110A-B that are inter-connected via physical network 105. Each host 110A/110B may include suitable hardware 112A/112B and virtualization software (e.g., hypervisor-A 114A, hypervisor-B 114B) to support various VMs. For example, hosts 110A-B may support respective VMs 131-134. Hardware 112A/112B includes suitable physical components, such as central processing unit(s) (CPU(s)) or processor(s) 120A/120B; memory 122A/122B; physical network interface controllers (NICs) 124A/124B; and storage disk(s) 126A/126B, etc. In practice, SDN environment 100 may include any number of hosts (also known as a "host computers", "host devices", "physical servers", "server systems", "transport nodes," etc.), where each host may be supporting tens or hundreds of virtual machines (VMs).

Hypervisor 114A/114B maintains a mapping between underlying hardware 112A/112B and virtual resources allocated to respective VMs. Virtual resources are allocated to respective VMs 131-134 to support a guest operating system (OS; not shown for simplicity) and application(s) 141-144. For example, the virtual resources may include virtual CPU, guest physical memory, virtual disk, virtual network interface controller (VNIC), etc. Hardware resources may be emulated using virtual machine monitors (VMMs). For example in FIG. 1, VNICs 161-164 are virtual network adapters for VMs 131-134, respectively, and are emulated by corresponding VMMs (not shown for simplicity) instantiated by their respective hypervisor at respective host-A 110A and host-B 110B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B implements virtual switch 115A/115B and logical distributed router (DR) instance 117A/117B to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-B and represented internally using forwarding tables 116A-B at respective virtual switches 115A-B. Forwarding tables 116A-B may each include entries that collectively implement the respective logical switches. Further, logical DRs that provide logical layer-3 connectivity may be implemented collectively by DR instances 117A-B and represented internally using routing tables (not shown) at respective DR instances 117A-B. The routing tables may each include entries that collectively implement the respective logical DRs.

Packets may be received from, or sent to, each VM via an associated logical port. For example, logical switch ports 171-174 are associated with respective VMs 131-134. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-B in FIG. 1, whereas a "virtual switch" may refer generally to a software switch or software implementation of a physical switch. In practice, there is usually a one-to-one mapping between a logical port on a logical switch and a virtual port on virtual switch 115A/115B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual extensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks. In the example in FIG. 1, VM1 131 on host-A 110A and VM3 133 on host-B 110B may be connected to the same logical switch and located on the same logical layer-2 segment, such as a segment with VXLAN network identifier (VNI)=6000.

SDN controller 180 and SDN manager 184 are example network management entities in SDN environment 100. One example of an SDN controller is the NSX controller component of VMware NSX® (available from VMware, Inc.) that operates on a central control plane. SDN controller 180 may be a member of a controller cluster (not shown for simplicity) that is configurable using SDN manager 184 operating on a management plane. Network management entity 180/184 may be implemented using physical machine (s), VM(s), or both. Logical switches, logical routers, and logical overlay networks may be configured using SDN controller 180, SDN manager 184, etc. To send or receive control information, a local control plane (LCP) agent (not shown) on host 110A/110B may interact with central control plane (CCP) module 182 at SDN controller 180 via control-plane channel 101/102.

Hosts 110A-B may also maintain data-plane connectivity with each other via physical network 105 to facilitate communication among VMs located on the same logical overlay network. Hypervisor 114A/114B may implement a virtual tunnel endpoint (VTEP) (not shown) to encapsulate and decapsulate packets with an outer header (also known as a tunnel header) identifying the relevant logical overlay network (e.g., using a VXLAN (or "virtual" network identifier (VNI) added to a header field). For example in FIG. 1, hypervisor-A 114A implements a first VTEP associated with (IP address=IP-A, MAC address=MAC-A, VTEP label=VTEP-A), and hypervisor-B 114B a second VTEP with (IP-B, MAC-B, VTEP-B), etc. Encapsulated packets may be sent via an end-to-end, bi-directional communication path (known as a tunnel) between a pair of VTEPs over physical network 105.

One of the challenges in SDN environment 100 is improving the overall network security. To protect VMs 131-134 against security threats caused by unwanted packets, hypervisor 114A/114B implements distributed firewall (DFW) engine 118A/118B to filter packets to and from associated VMs. For example, at host-A 110A, hypervisor 114A implements DFW engine 118A to filter packets for VM1 131 and VM2 132. SDN controller 180 may be used to configure firewall rules that are enforceable by DFW engine 118A/118B. In practice, network packets may be filtered according to firewall rules at any point along the datapath from a source (e.g., VM1 131) to a physical NIC (e.g., 124A). In one embodiment, a filter component (not shown) may be incorporated into each VNIC 141-144 to enforce firewall rules that are associated with the VM (e.g., VM1 131) corresponding to that VNIC (e.g., VNIC 161). The filter components may be maintained by DFW engines 118A-B. In practice, however, DFW engine 118A/118B might not be able to defend against all possible security threats.

Service Query Handling

In the following, an example security threat during service query handling will be explained in relation to Domain Name System (DNS) query handling. In particular, consider a scenario where APP1 141 ("client") running VM1 131 wishes to communicate with a target server (not shown) associated with a domain name (e.g., www.xyz.com). Prior to initiating the communication, the domain name needs to be resolved into an IP address. VM1 131 may generate and send a DNS query to DNS resolver 210 to request for a translation of a domain name (e.g., www.xyz.com) to a routable network address (e.g., IP address=IP-xyz). To improve performance, DNS resolver 210 and clients (e.g., VM1 131) generally use caching. For example, based on a DNS reply to the DNS query, VM1 131 may store mapping information identifying (domain name, IP address) in DNS cache 230.

During DNS query handling, one potential security threat in SDN environment 100 is DNS cache poisoning (also known as DNS spoofing). Here, an attacker may attempt to divert Internet traffic away from legitimate servers towards malicious servers by exploiting vulnerabilities in the DNS protocol. DNS poisoning attacks typically target DNS resolver 210 by injecting malicious mapping information into a DNS cache of DNS resolver 210. If successful, clients may be redirected to access a malicious server. In practice, DNS resolver 210 may implement various defense mechanisms to counter such resolver-side attacks.

Figure 2:
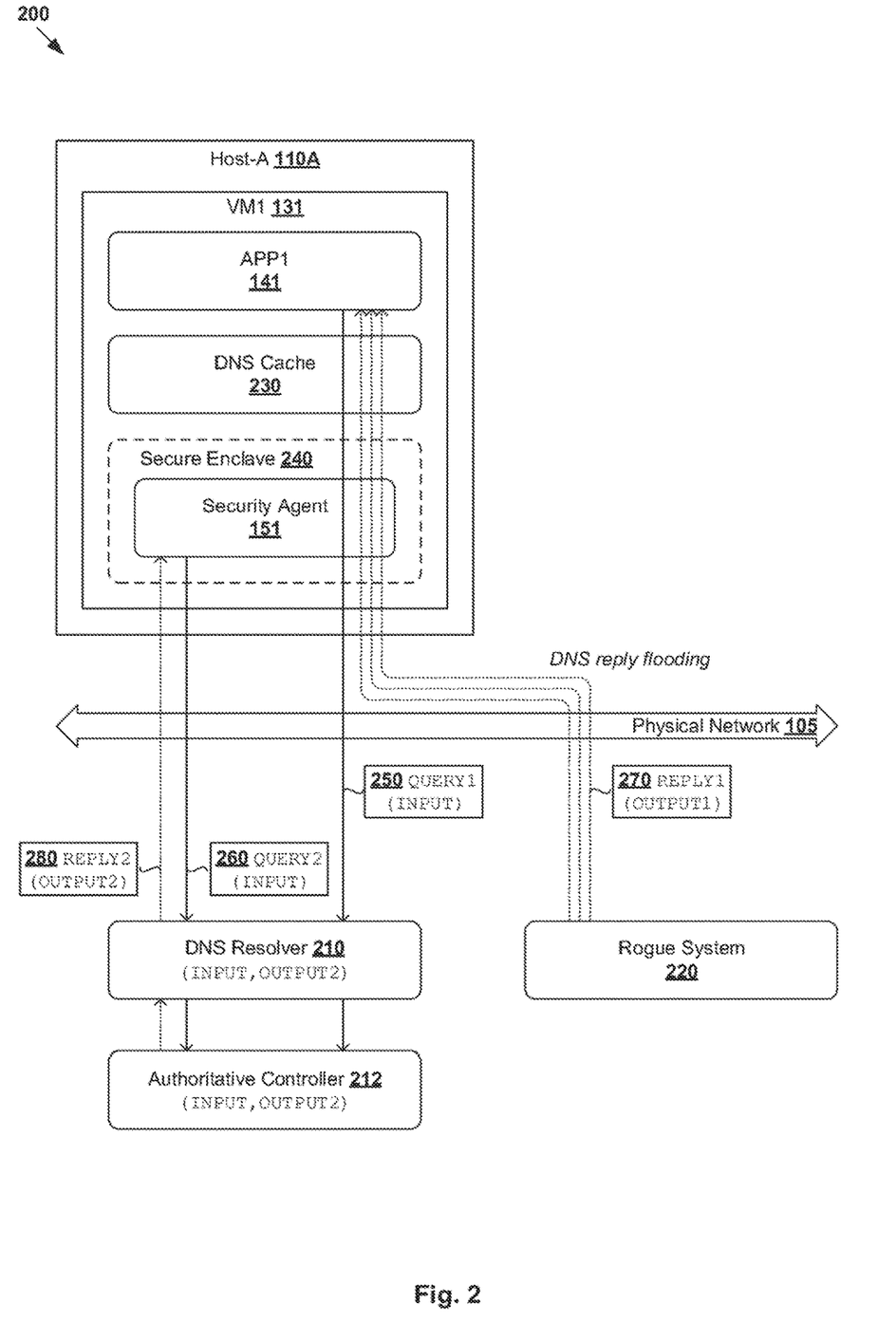
FIG. 2 is a schematic diagram illustrating an example of security threat detection during service query handling in an SDN environment.

A newer class of DNS cache poisoning attack targets the client-side cache, such as DNS cache 230 of VM1 131 (see also FIG. 2). For example, malware may be downloaded onto a victim client machine=VM1 131 after accessing a malicious website. With the assistance of the malware, rogue system 220 may then send a malicious DNS reply to VM1 131 to divert traffic to a malicious server. Since poisoned entries in DNS cache 230 may be shared with other VMs 132-136 to reduce the number of unnecessary DNS queries, this risk exposing the rest of SDN environment 100 to malicious attacks.

Security Threat Detection

According to examples of the present disclosure, security threat detection may be performed during service query handling to improve data center security. Examples of the present disclosure may be implemented to reduce the risk of malicious attacks that exploit vulnerabilities in a service protocol such as DNS. Using enclave-based technologies, security agents 151-156 may be implemented by respective VMs 131-136 to detect potential security threats. Using VM1 131 for example, security agent 151 may be configured to operate in a "secure enclave" that is isolated from other processes running on VM1 131. This way, during service query handling, security agent 151 may independently and securely verify whether query replies have been poisoned or compromised.

Figure 3:
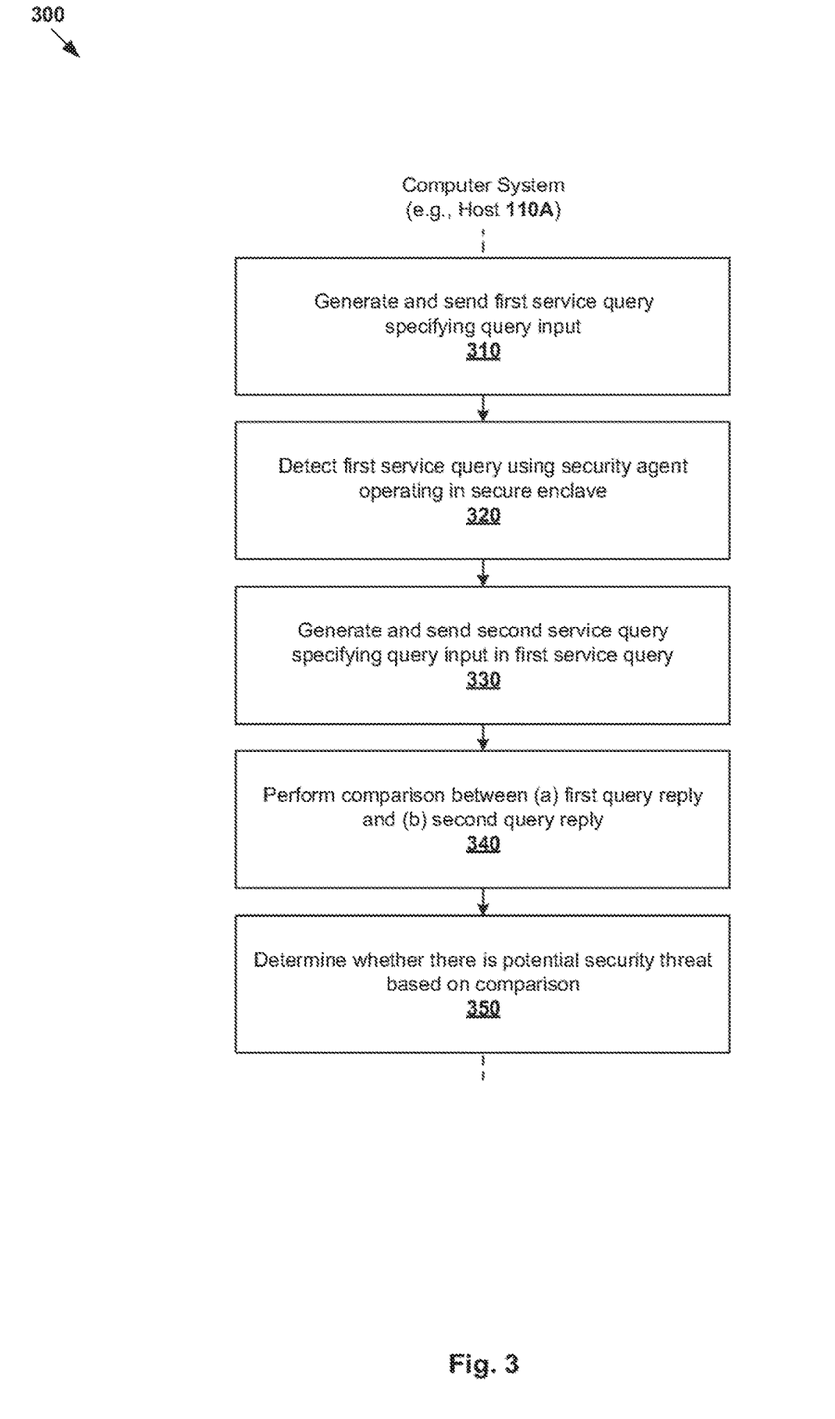
FIG. 3 is a flowchart of an example process for a computer system to perform security threat detection during service query handling in an SDN environment.

In the following, various examples will be explained using FIG. 2 and FIG. 3. FIG. 2 is a schematic diagram illustrating example 200 of security threat detection during service query handling in SDN environment 100. FIG. 3 is a flowchart of example process 300 for a computer system to perform security threat detection during service query handling in SDN environment 100. Example process 300 may include one or more operations, functions, or actions illustrated by one or more blocks, such as 310 to 350. The various blocks may be combined into fewer blocks, divided into additional blocks, and/or eliminated depending on the desired implementation. Examples of the present disclosure may be implemented by any suitable "computer system," such as host 110A/110B/110C, etc.

At 310 in FIG. 3, process APP1 141 running on VM1 131 may generate and send first service query 250 specifying a query input according to a service protocol. At 320, security agent 151 that is configured to operate in security enclave 240 may detect first service query 250 ("QUERY1"). At 330, security agent 151 may generate and send second service query 260 ("QUERY2") specifying the same query input as in first service query 250. Using service protocol=DNS, both first service query 250 and second service query 260 may each be a DNS query to resolve query input=domain name into a query output=IP address.

At 340 in FIG. 3, security agent 151 may perform a comparison between (a) first reply 270 ("REPLY1") received by APP1 141 responsive to first service query 250 and (b) second reply 280 ("REPLY2") received by security agent 151 responsive to second service query 260. At 350, based on the comparison, security agent 151 may determine whether there is a potential security threat associated with VM1 131. In the example in FIG. 2, security agent 151 may detect a discrepancy a first query output ("OUTPUT1") in first reply 270 when compared to a second query output ("OUTPUT2") in second reply 280. In this case, security agent 151 may determine that there is a potential security threat and perform any remediation action(s) accordingly. Various examples will be explained below.

Enclave-Based Security Agent

Figure 4:
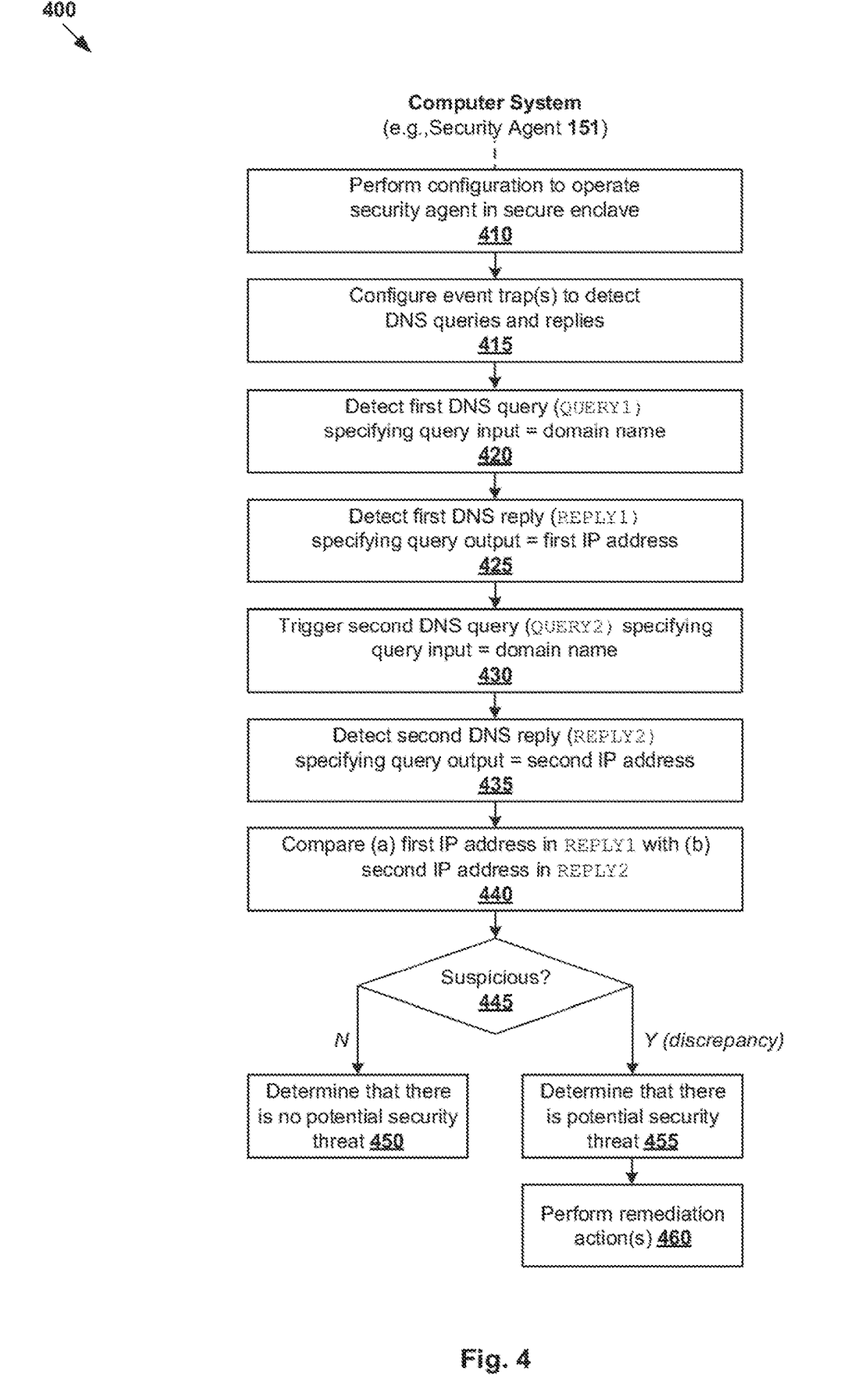
FIG. 4 is a flowchart of an example detailed process for a computer system to perform security threat detection during service query handling in an SDN environment.

FIG. 4 is a flowchart of example detailed process 400 for security threat detection during service query handling in SDN environment 100. Example process 400 may include one or more operations, functions, or actions illustrated at 410 to 460. The various operations, functions or actions may be combined into fewer blocks, divided into additional blocks, and/or eliminated depending on the desired implementation. The example in FIG. 4 will be explained using FIG. 5, which is a schematic diagram illustrating first example 500 in which no security threat is detected during service query handling.

At 410 in FIG. 4, security agent 151 may be configured to run in secure enclave 240 of VM1 131. According to enclave-based technologies, the term "secure enclave" may refer generally to a region of memory in a guest memory address space that is fully isolated from other process(es) and guest OS running on VM1 131. Any suitable enclave-based technology may be implemented, such as trusted execution environment (TEE) technology, Intel® Software Guard Extension (SGX) from Intel® Corporation, Guest Monitoring Mode (GMM) from VMware, Inc., etc.

Figure 5:
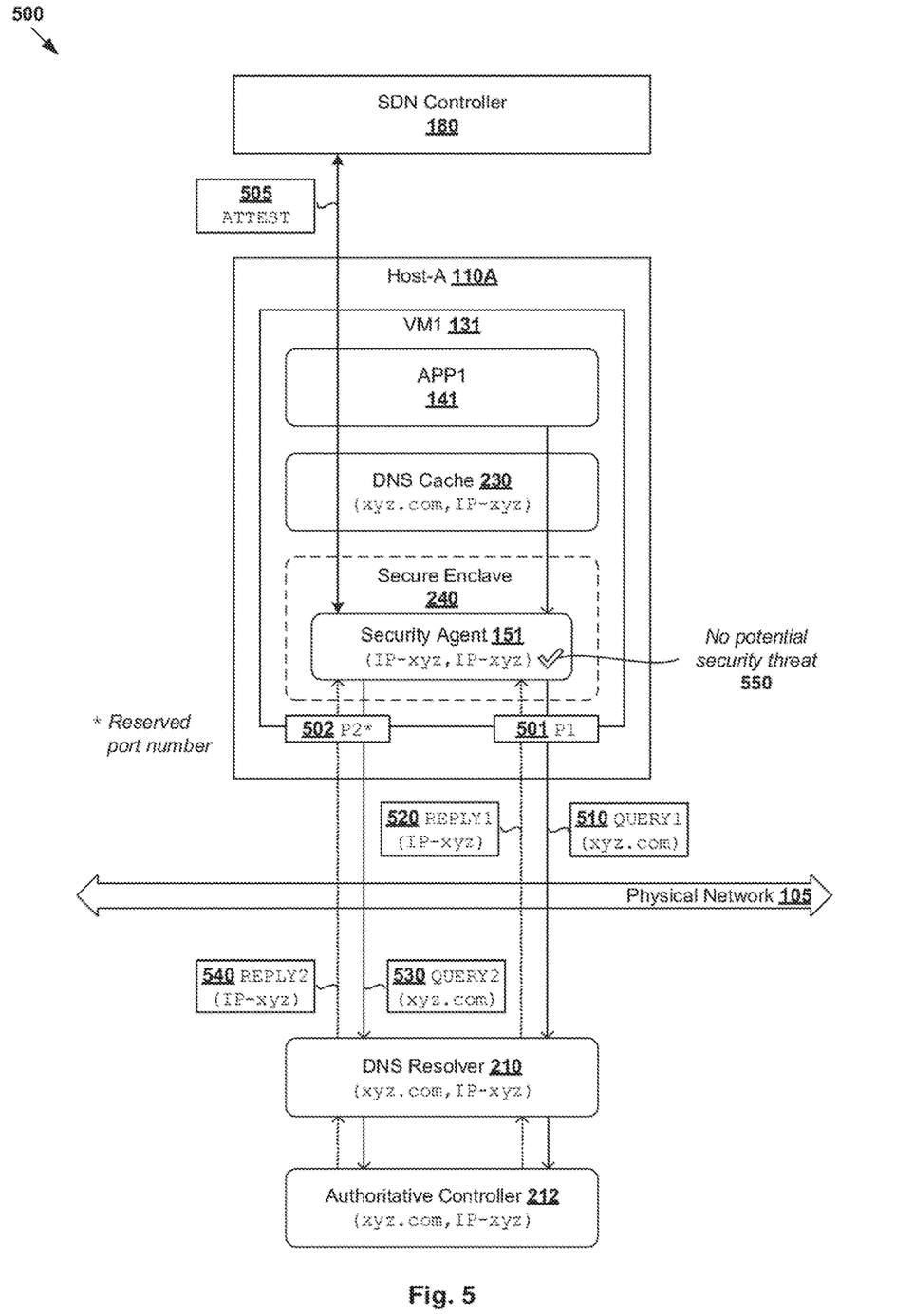
FIG. 5 is a schematic diagram illustrating a first example in which no security threat is detected during service query handling.

In the example in FIG. 5, block 410 may involve host-A 110A starting security agent 151 in GMM and requesting for attestation by SDN controller 180 acting as a cloud manager. Here, security agent 151 may generate and send a notification specifying a host identifier ID identifying host-A 110A and a universally unique (UUID) identifying VM1 131. As an additional security measure, the notification may include a checksum for authentication. See 505 in FIG. 5.

Once attested by SDN controller 180, security agent 151 may be configured to run in the same context as VM1 131, but remain isolated from all other processes running on VM1 131, including privileged processes such as a guest OS kernel of VM1 131, etc. Security agent 151 may be assigned with at least one reserved port number (see "P2" 502) that is invisible to all other processes on VM1 131. In other words, no process running on VM1 131 is able to access the reserved port, except for security agent 151. The reserved port number(s) may be TCP and/or UDP port number(s) that are hidden from the guest OS of VM1 131.

At 415 in FIG. 4, security agent 151 may configure event trap(s) to trap service queries and replies generated according to a service protocol. Using DNS as an example, a synchronous event trapping mechanism may be implemented to trap DNS queries and responses. Note that DNS queries may be generated by any suitable process running on VM1 131, such as user-space or kernel-space process. DNS replies may be received from legitimate DNS resolver 210, or rogue system 220 pretending to be DNS resolver 210 by spoofing the IP address of DNS resolver 210.

Any suitable event trapping mechanism(s) may be implemented at block 415. One example may involve registering for callbacks relating to DNS queries and replies, such as using Windows Filtering Platform (WFP), etc. Using WFP, an event trap may be developed to detect DNS queries and replies by interacting with packet processing operations at one or more layers of the networking stack of a guest OS of VM1 131. Another example is to configure distributed virtual filter(s) supported by hypervisor 114A/114B to trap DNS queries and responses.

Secure Verification

At 420 and 425 in FIG. 4, security agent 151 may detect a first DNS query generated and sent by APP1 141 running on VM1 131 and a first DNS reply received by APP1 141 responsive to the first DNS query. Note that APP1 141 may be a user-space process (e.g., application) or a kernel-space process (e.g., OS process). In the example in FIG. 5, first DNS query 510 may be configured to query DNS resolver 210 for an IP address associated with a query input=www.xyz.com. In response, first DNS reply 520 may specify query output=IP-xyz associated with the input domain name.

DNS resolver 210 may process first DNS query 510 using any suitable approach. For example, in response to detecting first DNS query 510, DNS resolver 210 may retrieve DNS record specifying mapping information (domain name=www.xyz.com, IP address=IP-xyz). DNS resolver 210 may first check whether DNS query 510 may be satisfied using cached information. If not (i.e., cache miss), DNS query 510 will be forwarded to authoritative controller 212.

Authoritative controller 212 may represent an authoritative name server that maintains DNS records and responds to DNS queries for domain names for a particular DNS zone it is responsible for. In practice, DNS resolver 210 may be a "recursive resolver" (also known as a "DNS recursor") that operates as the first stop for a DNS query. After receiving first DNS query 510, a recursive resolver will either respond with cached data, or execute a sequence of iterative queries in the case of a cache miss. In the latter case, DNS resolver 210 may send respective queries to a root name server (not shown), a top-level domain (TLD) name server (not shown), and finally to authoritative controller 212. After receiving a DNS reply from authoritative controller 212, DNS resolver 210 may send DNS reply 520 containing the requested IP address (e.g., IP-xyz) to APP1 141 for use in subsequent traffic to a target server.

DNS resolver 210 and/or authoritative controller 212 may maintain DNS record information in any suitable format. For example, an address (A, AAAA) record specifies an IP version 4 (IPv4) address or IP version 6 (IPv6) address that is mapped to a domain name. A CNAME record specifies redirection to another domain name. A reverse-lookup pointer (PTR) record specifies a domain name associated to an IP address. A host information (HINFO) record specifies general information about a host (e.g., OS information). A name server (NS) record specifies an authoritative name server for a given host. A service (SRV) record specifies a hostname and a port number of a particular service, etc.

At 430 and 435 in FIG. 4, security agent 151 may generate and send a second DNS query (see 530 in FIG. 5), thereby triggering an independent verification of mapping information (domain name=www.xyz.com, IP-xyz). Second DNS query 530 may be configured to specify the same query input=www.xyz.com in first DNS query 510. As a defense mechanism, security agent 151 may send second DNS query 530 from reserved port number "P2" 502 (e.g., destination port number). As discussed above, "P2" 502 may be specifically assigned to security agent 151 and hidden from APP1 141. As such, any malware running on APP1 141 or another process on VM1 131 will not be able to use "P2" 502.

At 440 and 445 in FIG. 4, in response to receiving a second DNS reply (see 540) responsive to second DNS query 530, security agent 151 may compare first DNS reply 520 with second DNS reply 540. In the example in FIG. 5, both first DNS reply 520 and second DNS reply 540 specify the same DNS query output=IP-xyz that is mapped to DNS query input=www.xyz.com.

At 445 (no) and 450 in FIG. 4, in response to determination that first DNS reply 520 is not suspicious based on its comparison with second DNS reply 540, security agent 151 may determine that a potential security threat is not likely (see 550 in FIG. 5). No remediation action is required.

Security Threat Detection

Figure 6:
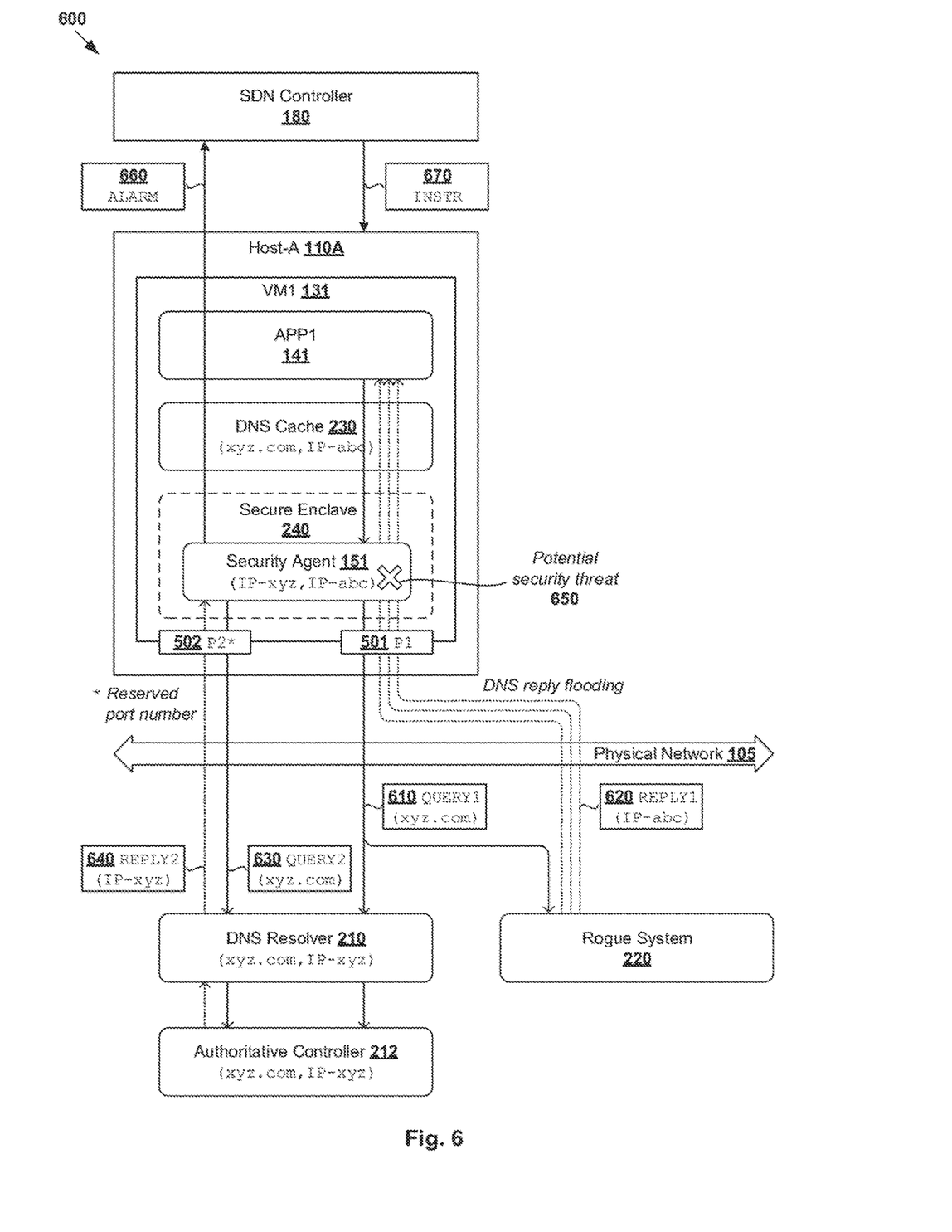
FIG. 6 is a schematic diagram illustrating a second example in which a potential security threat is detected during service query handling.

FIG. 6 is a schematic diagram illustrating second example 600 in which a potential security threat is detected during service query handling. Unlike the example in FIG. 5, consider a different scenario where APP1 141 is infected by malware, such as after accessing a malicious or compromised website on an external network. In practice, the term "malware" is used as an umbrella term to cover various forms of hostile or intrusive software, such as viruses, worms, Trojan horse programs, spyware, phishing, adware, riskware, rootkits, spams, scareware, ransomware, etc.

Once infected by malware, APP1 141 may start consuming all available port numbers, except for one port number "P1" 501. The malware then informs an off-path attacker of the unused port, such as rogue system 220 that is capable of spoofing the IP address of DNS resolver 210. Next, the malware may start accessing sites (www.xyz.com) for which the malware wishes to corrupt in DNS cache 230. To resolve the domain name into an IP address, first DNS query 610 will be sent via unused port number "P1" 501. Rogue system 220 may then send a large number of malicious DNS replies 620 to VM1 131 on "P1" 501 to divert traffic to a malicious server. Note that DNS resolver 210 might also reply with the correct IP address (not shown in FIG. 6), but the reply might arrive after a malicious DNS reply from rogue system 220 or simply disregarded due to the DNS reply flooding caused by rogue system 220.

According to examples of the present disclosure, security agent 151 may detect first DNS query 610 specifying query input=www.xyz.com and first DNS reply 620 specifying query output=IP-abc associated with the malicious server. In response, security agent 151 may perform an independent verification by generating and sending second DNS query 630 from reserved port number "P2" 502. Since security agent 151 operates in secure enclave 240 that is isolated from APP1 141, security agent 151 is protected against the malware running on APP1 141. In response to second DNS query 630, security agent 151 may receive second DNS reply 640 from DNS resolver 210 via reserved port number "P2" 502. See corresponding blocks 420-440 in FIG. 4.

Next, security agent 151 may compare first DNS reply 620 with second DNS reply 640. In the example in FIG. 6, first DNS reply 620 from rogue system 220 specifies incorrect mapping information (www.xyz.com, IP-abc) to divert traffic to a malicious sever. The incorrect mapping information causes cache poisoning at DNS cache 230 of VM1 131. In contrast, second DNS reply 640 from DNS resolver 210 specifies correct mapping information (www.xyz.com, IP-xyz) associated with the legitimate server.

Based on the comparison, security agent 151 may determine that first DNS reply 620 is suspicious. This is because of a discrepancy between (a) IP-abc in first DNS reply 620 and (b) IP-xyz in second DNS reply 640 even though the same DNS query input=www.xyz.com is used. As such, security agent 151 may determine that there is a potential security threat (see 650 in FIG. 6) associated with VM1 131, in that its DNS cache 230 might have been poisoned. In this case, security agent 151 may perform remediation action(s) associated with the potential security threat. See blocks 445 (yes), 455 and 460 in FIG. 4.

In the example in FIG. 6, security agent 151 generate and send an alarm or notification message (see 660) to inform SDN controller 180 of the potential security threat. SDN controller 180 may verify whether IP-abc is suspicious, such as by checking a blacklist of malicious IP addresses in a database, etc. SDN controller 180 may send an alert may to a user (e.g., network administrator) responsible for VM1 131. The alert may indicate the criticality level of the security threat. Also, any suitable workload protection approach may be implemented together with examples of the present disclosure, such as VMware AppDefense™ to ensure the integrity of hosts 110A-B and VMs 131-134, and streamline security reviews by users, etc.

If confirmed to be suspicious, SDN controller 180 may instruct (see 670) host-A 110A to isolate VM1 131. One approach is to configure firewall rule(s) that are enforceable by DFW engine 118A on host-A 110A. In practice, firewall rules may be defined using five tuples to match a specific packet flow, such as source IP address, source port number (PN), destination IP address, destination PN, and protocol, in addition to an action (e.g., allow or block). To block access to the malicious server, DFW engine 118A may be configured to drop any packet specifying destination or source IP address=IP-abc.

Additionally or alternatively, security agent 151 may be configured to monitor any subsequent attempt to access the malicious server using IP address=IP-abc. For example, security agent 151 may capture all three phases of a TCP handshake and block any packets to and from an IP address specified in a poisoned entry in DNS cache 230. This way, the risk of illegitimate TCP connections may be reduced. Using examples of the present disclosure, client-side DNS cache poisoning attack may be detected to initiate the appropriate remediation action. Although explained using DNS, it should be understood that examples of the present disclosure may be implemented for other scenarios that require independent and secure verification of query replies.

Container Implementation

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 6, container technologies may be used to run various containers inside respective VMs 131-134. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 6. For example, the instructions or program code, when executed by the processor of the computer system, may cause the processor to implement a "network device" to perform connectivity check according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a computer system to perform security threat detection during service query handling, wherein the method comprises:
   generating and sending, by a process running on a virtualized computing instance supported by the computer system, a first service query specifying a query input in the form of a first domain name system (DNS) query to resolve the query input in the form of a domain name associated with a target server;
   requesting, by a security agent running on the virtualized computing instance, for attestation by a management entity configured to manage the computer system;
   detecting, by the security agent, the first service query, wherein the security agent is configured to operate in a secure enclave, which is a region of memory in a guest memory address space that is fully isolated from all other processes, including the process and a guest operating system, running on the virtualized computing instance;
   generating and sending, by the security agent, a second service query in the form of a second DNS query to resolve the domain name, the second service query specifying the query input in the first service query, wherein generating and sending the second service query comprises:
      identifying a reserved port number that is assigned to the security agent operating in the secure enclave and hidden from the process;
      sending the second service query from the reserved port number to receive the second reply via the reserved port number;
   performing, by the security agent, a comparison between (a) a first reply received responsive to the first service query and (b) a second reply received responsive to the second service query, wherein performing the comparison comprises:
      detecting, by the security agent, the first reply in the form of a first DNS reply specifying a first Internet Protocol (IP) address mapped to the domain name;
      comparing the first IP address with a second IP address specified in the second reply in the form of a second DNS reply; and
   determining, by the security agent, whether there is a potential security threat associated with the virtualized computing instance based on the comparison, wherein determining whether there is a potential security threat comprises:
      in response to a determination that the first IP address is different from the second IP address, identifying the potential security threat in the form of DNS cache poisoning associated with the virtualized computing instance.

2. The method of claim 1, wherein determining whether there is a potential security threat comprises:
   in response to identifying the potential security threat, performing one or more of the following remediation actions: generating and sending an alarm to a management entity, isolating the virtualized computing instance and blocking traffic to and from an IP address specified in the second reply.

3. The method of claim 1, wherein detecting the first service query comprises:
   detecting the first service query using one or more event traps that are configured by the security agent to trap service queries and query replies.

4. A non-transitory computer-readable storage medium that includes a set of instructions which, in response to execution by a processor of a computer system, cause the processor to perform security threat detection during service query handling, wherein the method comprises:
   generating and sending, by a process running on a virtualized computing instance supported by the computer system, a first service query specifying a query input in the form of a first domain name system (DNS) query to resolve the query input in the form of a domain name associated with a target server;
   requesting, by a security agent running on the virtualized computing instance, for attestation by a management entity configured to manage the computer system;
   detecting, by the security agent, the first service query, wherein the security agent is configured to operate in a secure enclave, which is a region of memory in a guest memory address space that is fully isolated from all other processes, including the process and a guest operating system, running on the virtualized computing instance;
   generating and sending, by the security agent, a second service query in the form of a second DNS query to resolve the domain name, the second service query specifying the query input in the first service query, wherein generating and sending the second service query comprises:
      identifying a reserved port number that is assigned to the security agent operating in the secure enclave and hidden from the process;
      sending the second service query from the reserved port number to receive the second reply via the reserved port number;
   performing, by the security agent, a comparison between (a) a first reply received responsive to the first service query and (b) a second reply received responsive to the second service query, wherein performing the comparison comprises:
      detecting, by the security agent, the first reply in the form of a first DNS reply specifying a first Internet Protocol (IP) address mapped to the domain name;
      comparing the first IP address with a second IP address specified in the second reply in the form of a second DNS reply; and
   determining, by the security agent, whether there is a potential security threat associated with the virtualized computing instance based on the comparison, wherein determining whether there is a potential security threat comprises:
      in response to a determination that the first IP address is different from the second IP address, identifying the potential security threat in the form of DNS cache poisoning associated with the virtualized computing instance.

5. The non-transitory computer-readable storage medium of claim 4, wherein determining whether there is a potential security threat comprises:
   in response to identifying the potential security threat, performing one or more of the following remediation actions: generating and sending an alarm to a management entity, and isolating the virtualized computing instance.

6. The non-transitory computer-readable storage medium of claim 4, wherein detecting the first service query comprises:
    detecting the first service query using one or more event traps that are configured by the security agent to trap service queries and query replies.

7. A computer system, comprising:
    a processor; and
    a non-transitory computer-readable medium having stored thereon instructions that, when executed by the processor, cause the processor to:
        generate and send, by a process running on a virtualized computing instance supported by the computer system, a first service query specifying a query input in the form of a first domain name system (DNS) query to resolve the query input in the form of a domain name associated with a target server;
        request, by a security agent running on the virtualized computing instance, for attestation by a management entity configured to manage the computer system;
        detect, by the security agent, the first service query, wherein the security agent is configured to operate in a secure enclave, which is a region of memory in a guest memory address space that is fully isolated from all other processes, including the process and a guest operating system, running on the virtualized computing instance;
        generate and send, by the security agent, a second service query in the form of a second DNS query to resolve the domain name, the second service query specifying the query input in the first service query, wherein generating and sending the second service query comprises:
            identifying a reserved port number that is assigned to the security agent operating in the secure enclave and hidden from the process; and
            sending the second service query from the reserved port number to receive the second reply via the reserved port number;
        perform, by the security agent, a comparison between (a) a first reply received responsive to the first service query and (b) a second reply received responsive to the second service query, wherein performing the comparison comprises:
            detecting, by the security agent, the first reply in the form of a first DNS reply specifying a first Internet Protocol (IP) address mapped to the domain name;
            comparing the first IP address with a second IP address specified in the second reply in the form of a second DNS reply; and
        determine, by the security agent, whether there is a potential security threat associated with the virtualized computing instance based on the comparison, wherein determining whether there is a potential security threat comprises:
            in response to a determination that the first IP address is different from the second IP address, identifying the potential security threat in the form of DNS cache poisoning associated with the virtualized computing instance.

8. The computer system of claim 7, wherein the instructions for determining whether there is a potential security threat cause the processor to:
    in response to identifying the potential security threat, performing one or more of the following remediation actions: generate and send an alarm to a management entity, and isolating the virtualized computing instance.

9. The computer system of claim 7, wherein the instructions for detecting the first service query cause the processor to:
    detect the first service query using one or more event traps that are configured by the security agent to trap service queries and query replies.

\* \* \* \* \*